United States Patent [19]

Serini et al.

[11] Patent Number: 5,037,220
[45] Date of Patent: Aug. 6, 1991

[54] PRINTING RIBBON COMPRISING POLYCONDENSATES

[75] Inventors: Volker Serini; Bernhard Schulte; Claus Burkhardt; Dieter Freitag, all of Krefeld; Uwe Hucks, Alpen; Werner Waldenrath, Cologne; Hans-Leo Weber, Rommerskirchen, all of Fed. Rep. of Germany

[73] Assignee: Bayer Aktiengesellschaft, Leverkusen-Bayerwerk, Fed. Rep. of Germany

[21] Appl. No.: 218,206

[22] Filed: Jul. 13, 1988

Related U.S. Application Data

[63] Continuation of Ser. No. 43,969, Apr. 29, 1987, abandoned.

[30] Foreign Application Priority Data

May 10, 1986 [DE] Fed. Rep. of Germany ....... 3615764

[51] Int. Cl.[5] .................. B41J 31/04; B41J 31/00; B32B 9/04; C08G 63/64
[52] U.S. Cl. .................. 400/241.1; 524/496; 524/601; 528/176; 528/179; 528/180; 528/181; 528/182; 528/193; 528/194
[58] Field of Search .................. 400/241.1, 120; 528/176, 179-182, 193-194; 524/601, 496

[56] References Cited

U.S. PATENT DOCUMENTS

| | | | |
|---|---|---|---|
| 1,941,474 | 1/1934 | Jaegger | 524/111 |
| 4,103,066 | 7/1978 | Brooks et al. | 524/601 |
| 4,105,633 | 8/1978 | Swart et al. | 528/176 |
| 4,320,170 | 3/1982 | Findlay | 400/241.1 |
| 4,371,660 | 2/1983 | Calvndann et al. | 524/601 |
| 4,391,938 | 7/1983 | Memon et al. | 524/601 |
| 4,421,429 | 12/1983 | Graham | 400/241.1 |
| 4,425,161 | 1/1984 | Shibahashi et al. | 427/148 |
| 4,464,497 | 8/1984 | Belfoure | 524/114 |
| 4,517,328 | 5/1985 | Schmidt et al. | 524/601 |
| 4,532,290 | 7/1985 | Jaquiss et al. | 524/601 |
| 4,547,088 | 10/1985 | Shattuck | 428/913 |
| 4,654,411 | 3/1987 | Serini et al. | 528/181 |
| 4,661,567 | 4/1987 | Tyrell et al. | 528/179 |
| 4,678,701 | 7/1987 | Pennington et al. | 400/241.1 |
| 4,687,360 | 8/1987 | Wellman et al. | 400/241.1 |
| 4,710,782 | 12/1987 | Hayashi et al. | 400/241.1 |
| 4,721,703 | 1/1988 | Kobayashi et al. | 428/481 |
| 4,775,578 | 10/1988 | Hayashi et al. | 400/120 |
| 4,786,708 | 11/1988 | Serini et al. | 528/193 |

FOREIGN PATENT DOCUMENTS 0027844 5/1981 European Pat. Off. .
1218570 6/1966 Fed. Rep. of Germany .

Primary Examiner—Herbert J. Lilling
Attorney, Agent, or Firm—Connolly and Hutz

[57] ABSTRACT

Films from aromatic polyesters and from aromatic polyestercarbonates are excellently suitable for preparing printing ribbons, in particular for thermal and electrothermal recording processes.

6 Claims, No Drawings

PRINTING RIBBON COMPRISING POLYCONDENSATES

This application is a continuation of application Ser. No. 043,969 filed Apr. 29, 1987 now abandoned.

The subject of the invention is the use of films of polycondensates for the manufacture of printing ribbons, characterized in that the polycondensates contain 75–100 mol-% of bifunctional structural units of the formulae (1) and optionally (2)

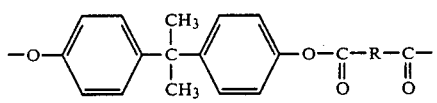 (1)

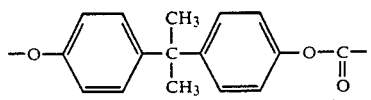 (2)

and 25–0 mol-% of bifunctional structural units of the formulae (3) and optionally (4)

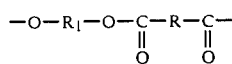 (3)

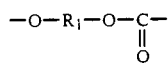 (4)

where the acid radicals —CO—R—CO— in the formulae (1) and (3) denote 75–100 mol-% of tere- and/or isophthalic acid radicals and to 25–0 mol-% of radicals of other aromatic dicarboxylic acids and the radicals —O—$R_1$—O— in the formulae (3) and (4) denote other diphenols than the 2,2-bis(4-hydroxyphenyl)propane radicals contained in formula (1) and (2), and the molar ratio of ester groups to carbonate groups in the polycondensates is 100/0 to 10/90.

The radical —O—$R_1$—O— in the formulae (3) and (4) are based for example on the following diphenols HO—$R_1$—OH:
hydroquinone,
resorcin,
dihydroxydiphenyls,
bis(hydroxyphenyl)alkanes with the exception of bisphenol A,
bis(hydroxyphenyl)cycloalkanes,
bis(hydroxyphenyl) sulphides,
bis(hydroxyphenyl) ethers,
bis(hydroxyphenyl) ketones,
α, α'-bis(hydroxyphenyl)diisopropylbenzenes,
and also their ring-halogenated and ring-alkylated compounds. These and other suitable diphenols are, for example, described in the monograph by Hermann Schnell, Chemistry and Physics of Polycarbonates, New York, Interscience Publishers 1964, Polymer Reviews, Vol. 9, the publication by V. Serini, D. Freitag and H. Vernaleken, Polycarbonates from o,o,o',o'-tetramethyl substituted bisphenols, Angew. Makromol. Chem.55 (1976), 175–189 and the Deutsche Offenlegungsschriften (German Published Specifications) 2,063,050, 2,211,957, 2,615,038 and 2,248,817.

Preferably the radical —O—$R_1$—O— is based on the following diphenols HO—$R_1$—OH:
hydroquinone,
resorcin,
bis(4-hydroxydiphenyl),
bis(4-hydroxyphenyl)methane,
2,2-bis(4-hydroxyphenyl)butane,
1,1-bis(4-hydroxyphenyl)cyclohexane,
bis(4-hydroxyphenyl) sulphide,
bis(4-hydroxyphenyl) ether,
bis(4-hydroxyphenyl) ketone,
α,α-bis(4-hydroxyphenyl)-p-diisopropylbenzene,
2,2-bis(3,5-dimethyl-4-hydroxyphenyl)propane,
2,2-bis(3,5-dimethyl-4-hydroxyphenyl)methane,
2,2-bis(3,5-dimethyl-4-hydroxyphenyl)butane,
2,2-bis(3,5-dibromo-4-hydroxyphenyl)propane and
2,2-bis(3,5-dichloro-4-hydroxyphenyl)propane.

Particularly preferred diphenols HO—$R_1$—OH are
hydroquinone,
bis(4-hydroxydiphenyl),
bis(4-hydroxydiphenyl) sulphide,
bis(4-hydroxydiphenyl) ether,
2,2-bis(3,5-dimethyl-4-hydroxyphenyl)propane,
2,2-bis(3,5-dichloro-4-hydroxyphenyl)propane and
2,2-bis(3,5-dibromo-4-hydroxyphenyl)propane.

Aromatic dicarboxylic acids other than tere- and isophthalic acid which form the basis of the acid radicals —CO—R—CO— of the formulae (1) and (3) are, for example,
o-phthalic acid,
monochloroterephthalic acid,
2,5-dichloroterephthalic acid,
4,4'-dicarboxydiphenyl ether,
diphenylmethane-4,4'-dicarboxylic acid,
diphenyl-4,4'-dicarboxylic acid,
naphthalene-1,4-dicarboxylic acid,
naphthalene-1,8-dicarboxylic acid.

Both the diphenols HO—$R_1$—OH and also the aromatic dicarboxylic acids other than tere- and isophthalic acid can be used individually or as mixtures in addition to the 2,2-bis(4-hydroxyphenyl)propane and the tere- and/or isophthalic acid.

The films to be used according to the invention are based on polycondensates which contain preferably 10–0 mol-% and particularly preferably 0 mol-% of bifunctional structural units of the formulae (3) and (4).

The films to be used according to the invention are based on polycondensates in which the acid radicals —CO—R—CO— consist preferably of 90–100 mol-% and particularly preferably of 100 mol-% of tere- and/or isophthalic acid units.

In the polycondensates which form the basis of the films to be used according to the invention, the tere-/isophthalic radical ratio may be 100/0 to 0/100. If the molar ratio of ester to carbonate groups in the polycondensates which form the basis of the films to be used according to the invention is less than or equal to 1/1, the terephthalic acid/isophthalic acid radical ratio is preferably at least 10/90, more preferably at least 40/60, most preferably at least 60/40, in particular at least 80/20 and specially 100/0.

If the molar ratio of ester to carbonate groups in the polycondensates which form the basis of the films to be used according to the invention is greater than 1/1, the terephthalic acid/isophthalic acid radical ratio is preferably 97/3 to 3/97, particularly preferably 93/7 to 15/85, quite particularly preferably 80/20 to 35/65 and in particular 70/30 to 50/50.

In the polycondensates which form the basis of the films to be used according to the invention, the molar ratio of ester to carbonate groups is preferably 99/1 to 10/90, particularly preferably 98/2 to 20/80, quite particularly preferably 97/3 to 40/60, with 95/5 to 65/35 being better, and in particular 90/10 to 80/20.

Polycondensates which form the basis of the films to be used according to the invention are understood to mean also any mixtures of at least two polycondensates from the series comprising the aromatic polycarbonates, polyesters and polyestercarbonates, provided they satisfy the requirements imposed in the introduction on the nature and ratio of the bivalent structural units.

Thus, for example, mixtures of aromatic polycarbonates and aromatic polyesters, mixtures of aromatic polyesters and aromatic polyestercarbonates, mixtures of aromatic polycarbonates and aromatic polyestercarbonates, and also mixtures of aromatic polyestercarbonates of different polycarbonate content can be used, the preference increasing in the above sequence. Most strongly preferred, however, are polycondensates whose composition is fixed by the synthesis and which are therefore not obtainable by subsequent mixing.

The films to be used according to the invention may e both extruded films and cast films. The use of cast films, however, represents a preferred embodiment of this invention. Extruded films are understood to mean films which are drawn from the melt of the polycondensate, e.g. via slit nozzles or else via annular nozzles as in blowforming. Cast films are understood to mean films which are produced by pouring a polycondensate solution on a substrate and evaporating the solvent.

The polycondensates which may be employed for the extruded films which can be used according to the invention have relative viscosities of 1.2-1.80, preferably of 1.25-1.60, particularly preferably of 1.30-1.45 (measured at $c = 5$ g/l and 25° C. in phenol/o-dichlorobenzene 1/1 parts by weight).

The polycondensates which can be employed for the cast films which can be used according to the invention have relative viscosities of 1.20-5.0, preferably of 1.25-4.0, particularly preferably of 1.50-3.5, in particular of 1.7-3.0 and particularly of 2.0-2.5 (measured at $c = 5$ g/l and 25° C. in methylene chloride).

While the extruded films which can be used according to the invention have thickness of 0.5-1,000 μm, preferably 2-600 μm, particularly preferably 5-300 μm and quite particularly preferably of 10-200 μm, the cast films have thickness of 0.1-800 μm, preferably of 1.0-600 μm, particularly preferably of 2.0-400 μm and quite particularly preferably of 3.0-200 μm.

The polycondensates which can be employed to prepare the films to be used according to the invention can be prepared by various processes such as e.g. by various melt transesterification processes, by preparation processes in homogeneous solution and by the two-phase interface process. In this connection, various derivatives of the aromatic dihydroxy compounds and aromatic dicarboxylic acids and of carbonic acid can be employed as monomers, such as e.g. bischlorocarbonic acid esters, bis-acid chlorides, phosgene, dicarboxylic acid diphenyl esters, diphenyl carbonate and others.

Preferably, the polycondensates which can be employed for the films to be used according to the invention are prepared by a two-phase interface process. Thus, for example, an aromatic polyester carbonate can be prepared from 2,2-bis(4-hydroxyphenyl)propane and optionally further aromatic dihydroxyl compounds, a mixture of tere- and isophthalic acid dichlorides and optionally further dicarboxylic acid dichlorides, and also phosgene as monomer. For this purpose, for example, dihydroxyl compounds and a phenol as chain limiter are dissolved in aqueous alkali. To this solution are added one or more organic solvents, e.g. halogenated hydrocarbons, and the dicarboxylic acid chlorides dissolved in the said solvent are added while stirring. Subsequent thereto the required quantity of phosgene is added while stirring. Then a tertiary amine is added as catalyst and stirring is continued for some time. The polyestercarbonate formed can then be isolated from the organic phase to be separated.

As chain limiters, use can be made of a whole series of condensable monofunctional compounds or their derivatives, such as phenols like e.g. phenol, o-, m-, p-cresol, p-tert-butylphenol, p-isooctylphenol, carboxylic acids like e.g. benzoic acid, secondary amines like e.g. methylaniline, and others, as described in the literature on aromatic polyesters and polyestercarbonates. Derivatives of the phenolic compounds are, for example, chlorocarbonic acid esters and phenyl carbonates, derivatives of the acids, for example, acid chlorides and phenyl esters. The phenols, in particular p-isooctylphenol, are preferred.

As catalysts use is in general made of tertiary amines like e.g. triethylamine, tripropylamine, tributylamine and N-ethylpiperidine, or phase-transfer catalysts like quaternary ammonium compounds or phosphonium compounds. These and other catalysts are described in detail in the literature on the preparation of aromatic polyesters and polyestercarbonates.

As solvents, use is in general made of chlorinated hydrocarbons of an aliphatic or aromatic nature and mixtures thereof like e.g. methylene chloride and methylene chloride/chlorobenzene mixtures; preferably, methylene chloride is used.

During the condensation, the pH is in general kept at over 7, in particular between 8 and 14. The temperature is in general below the boiling point of the organic solvents, preferably at about 10°-50° C. The process can be manifoldly varied, for example by altering the sequence and the instant in time when the reactants and catalyst are added, by employing more than one catalyst, by altering the pH, the temperature, the stirring conditions and other factors in addition.

The polycondensates to be used according to the invention may contain the ester and the carbonate units distributed more or less in block form or statistically, depending on the nature of the preparation process. In addition, they may be branched if branching polyfunctional compounds are also incorporated in the polycondensation reaction. Such polyfunctional compounds are manifoldly described in the polyester and polyestercarbonate literature.

The preparation of the polycondensates to be used according to the invention by mixing one or more polycondensates which are mentioned above is performed via the combined solution of said polycondensates or via their melt. Surprisingly, it was found that by conducting the two-phase interface process in a special manner in the preparation of polyestercarbonates employable for the films according to the invention with the relative viscosities of 1.7-3.0, preferably of 2.0-2.5 (measured at $c = 5$ g/l and 25° C. in methylene chloride) polyesters can be prepared which are particularly suitable for films. Films prepared from these polyestercarbonates exhibit in particular more favourable elongations at break, higher draw ratios when stretched and fewer breaks at high draw ratios than corresponding polyestercarbonates prepared in the usual manner.

The conducting of the two-phase interface process in a special manner in the preparation of these polyestercarbonates particularly suitable for films implies the use of three reactors succeeding each other which effect the mixing of the two-phase mixture and in which the polycondensation reaction is continuously performed. For example, the following reactors effecting the mixing of the two-phase mixture can be employed as reactors: stirred vessels, loop reactors, rotor-and-stator systems, nozzle-type reactors and other in addition.

In this connection, the diphenols dissolved as diphenolates in an alkaline aqueous phase, and the acid chlorides dissolved in a chlorinated hydrocarbon or a mixture of chlorinated hydrocarbons, are simultaneously and continuously fed into the first reactor. Preferably, methylene chloride/chlorobenzene mixtures are employed as solvent, particularly preferably methylene chloride. The two-phase mixture continuously discharged from the first reactor and also phosgene, optionally alkali-metal hydroxide and optionally additional solvent, are simultaneously and continuously fed into a second reactor. The two-phase mixture discharged from the second reactor and optionally further alkali-metal hydroxide are continuously fed into a third reactor. The two-phase mixture continuously emerging from the third reactor is separated, the organic phase is washed in the absence of electrolyte and the polyestercarbonate is extracted by spray drying, evaporation extrusion, precipitation/drying or evaporation kneading. At least some of the phosgene used in total can be fed also into the first reactor. The catalyst can be fed continuously into one or into several of the reactors. Preferred as catalysts are tertiary amines. These are preferably fed into the third reactor. Optionally employed chain limiters can be fed continuously into one or more reactors, but preferably it is introduced into the first reactor.

The preparation of the extruded films which can be used according to the invention from the polcondensates is performed via the melt of the polycondensates, e.g. via slot nozzles or else via annular nozzles as in blowforming.

The preparation of the preferred cast films which can be used according to the invention from the polycondensates is performed via their solution in organic solvents. Suitable solvents are, in particular, chlorinated hydrocarbons like e.g. methylene chloride, ethylene chloride, chloroform and chlorobenzene, or mixtures thereof. Preferred are methylene chloride/chlorobenzene mixtures and, in particular, methylene chloride. Additions of, for example, methanol, ethanol, acetone, toluene, xylene, ethylene glycol and its mono- or diethers, propylene glycol and its ethers, glycerol, lauryl alcohol and its esters or phthalic acid esters can also be used at the same time. Such additions as, for example, toluene, ethers of propylene glycol or ethylene glycol are preferred.

The pouring of the polycondensate solutions to film thicknesses of 0.1–800 μm, preferably of 1–600 μm particularly preferably of 2–400 μm and quite particularly preferably of 4–200 μm can be performed on strip or drum casting machines with known casters like stripper casters or pressure dye casters. Thus, for example, methylene chloride polycondensate solutions can be poured onto thermostatic rolls which may be matt or polished and which in general have temperatures of 10°–40° C. The evaporation of the methylene chloride takes place largely on the drum roll; residual solvent is then removed by means of further thermostatic rolls, in a circulating-air dryer by means of heating surface like IR radiator system, or other heating arrangements and also at higher temperatures, e.g. of 80°–150° C. Residual traces of solvent can be removed by further after-baking, optionally at still higher temperature. The film casting speeds can be varied and in the case of drum rolls of 1–5 m diameter are in general 2–4,000 m/sec, preferably 20–2,000 m/sec.

The polycondensate cast films which can be used according to the invention can be stretched mono- or biaxially on industrial stretching equipment, monoaxial stretching in the longitudinal direction, i.e. in the casting direction of the cast film, being preferred. For this purpose, known industrial stretching machines equipped with thermostattable rolls are suitable, the stretching being performed in a single-nip stretching system, i.e. between a heated roll (1) with the feed velocity $V_1$ and a heated roll (2) with the maximum temperature, the so-called stretching temperature, and a delivery velocity $V_2$ in a nip of approx. 3 to 10 mm width with the draw ratio $V_1:V_2$ being varied from 1:1.05 to 1:3.5, preferably from 1:1.1 to 1:3.0 and in particular from 1:1.2 to 1:2.5. In general, a third roll with a temperature lower than the stretching temperature is added for heat setting.

The stretching process can also be performed in a multiple-nip system, stretching machines with several driven rolls of different velocity and temperature being used and nondriven heated rolls being employed within the stretching zones for the purpose of smoothing out the stretching process. The diameter of the rolls can be varied from e.g. 40 to 300 mm, the surface of the stretching rolls in general being roughened up by blasting or rolls clad with plastic-material or ceramic being used for better adhesion. The temperature of the most highly heated stretching roll is termed the so-called stretching temperature $T_R$ which is varied in the range from approx. 170° to 330° C., preferably from 190° to 300° C.

As a result of stretching the films to be used according to the invention a whole series of properties such as e.g. the shrinkage behaviour at higher temperature, mechanical and electrical properties, e.g. tear strength and dielectric strength and others in addition can be advantageously altered.

The subject of the invention is also the use of films of the polycondensates described containing 5–45% by weight, preferably 10–40% by weight and particularly preferably 20–35% by weight of soot or graphite. According to the invention gas black, furnace soots or lampblack with mean primary particle sizes, which are in general determined by electron microscopy, of below 200 nanometer (nm), preferably below 100 nanometer (nm) and in particular with a mean primary particle size of less than 50 nanometer are suitable as soots. Suitable graphites are graphite powder or graphite dusts which are available, for example, in a wide core spectrum with particle diameters down to less than 100 μm, preferably less than 50 μm, graphite powder with mean particle sizes of less than 500 μm, preferably less than 100 μm being used and the graphite particles being further comminuted and ultrafinely dispersed in the polycondensate solution in the manner described below.

Preferably known, so-called conductivity soots are used which, in addition to a very (low primary particle size, and large external and internal surfaces, i.e. high porosity, and consequently high BET surfaces for $N_2$ adsorption and high dibutylphthalate (DBP) adsorption values, and are furthermore highly structured, i.e. exhibit considerable agglomeration or aggregation of individual soot particles into larger configurations like e.g. chains, the BET surfaces of the soot in general being greater than 20 $m^2$ and the DBP adsorption being above 40 ml per 100 g of soot.

Preferably soots with BET surfaces of over 50 $m^2/g$, particularly preferably of over 100 $m^2/g$ and quite particularly of over 500 $m^2/g$ in particular, however, of over 800 $m^2/g$ and DBP adsorptions of larger than 80 ml/100 g with mean primary particle sizes of less than 50 nanometers (nm) are preferred as conductivity soots. Such electrically conductive soots are available as commercial special soots with pronounced structures and high electrical conductivities.

The incorporation of soot or graphite into the polycondensates can be performed via solutions of polycondensates, either directly after completion of the preparation process of the polycondensate in the reaction solutions or after isolation of the polycondensate in the separately prepared polycondensate solutions has been performed, it being possible both to disperse and precomminute the electrically conductive additives first along in suitable media before dissolving the polycondensates or also to incorporate and finely disperse them in the presence of the dissolved polycondensate. Both possibilities can also be combined, a stepwise ultrafine dispersion then being achieved with advantage using known dispersion equipment like, e.g. rotor-stator apparatus, high-speed stirrer discs, high-pressure homogenizers, ultrasonic vibrators or bead mills containing e.g. steel balls of 0.5 to 3 mm diameter.

Suitable media for preparing these dispersions are chlorinated hydrocarbons like, for example, methylene chloride, ethylene chloride, chloroform or chlorobenzene, it being possible, however, also to use additions of, for example, methanol, ethanol, acetone, toluene, xylene, ethylene glycol and its mono- or diethers, propylene glycol and its ethers, glycerol, lauryl alcohol and its ethers and esters or phthalic acid esters at the same time.

The dispersions prepared in this way in the abovementioned organic media, which in general contain solid contents of polycondensate and soot and polycondensate and graphite of 4-25% by weight, preferably 6-18% by weight, are usually further subjected to a fine filtration with mean mesh widths of less than 100 $\mu$m, preferably of less than 50 $\mu$m to remove agglomerates of particles.

If soot is used, the thus filtered dispersions in general have only particle sizes of less than 10 $\mu$m (measurement by means of ultracentrifuge or laser diffraction), preferably of less than 5 $\mu$m.

The pouring of dispersions to film thicknesses of 1–600 $\mu$m, preferably of 2–400 $\mu$m and in particular of 4–200 $\mu$m can be performed on strip or drum casting machines with known casters like stripper or pressure casters, the polycondensate films prepared having a filler content of 5–45% weight, preferably 10 to 40% by weight and in particular 20 to 35% by weight (referred to the total solid). The evaporation of the solvents from the cast films can take place as has been described above for the unfilled cast polycondensate solutions. The film casting speed may be similar to that as described above for the unfilled polycondensate solutions.

A further subject of this invention is the use of films containing 5–45% by weight of soot or graphite which are obtained not only by pouring the dispersions described above and evaporating the solvent, but which are additionally stretched mono- or biaxially by 5–200%.

Surprisingly it was found in particular that the films to be used according to the invention filled with soot or graphite which are prepared by known casting processes and subsequently stretched by known methods have a particularly good pattern of properties in relation to electrical and mechanical properties like e.g. lower changes in specific resistances with storage time compared with the unstretched soot-filled cast films, in addition lower variations in thickness, high surface smoothness, good shrinkage behaviour, very low solvent content without additional separate post-drying and finally high elongation at break and tear strength.

The stretched, soot- or graphite-filled cast films which can be used according to the invention are therefore superior to the unstretched cast films which can be used according to the invention of the same thickness and same filler content, which is of decisive advantage primarily in relation to elongation at break and tear strength on the one hand, and storage time behaviour of specific surface resistance on the other.

For those skilled in the art it was unexpected that, in particular with filler contents of 10% by weight and over, the stretching results in films with good and reproducible quality, in particular in the region of very low film thicknesses of, for example, less than 0.05 mm, it being particularly unexpected that the elongation at break of the filled films is improved by the stretching, while the stretching of corresponding unfilled films causes a reduction in the elongation at break.

The films which can be used according to the invention employed for stretching and filled with soot or graphite can still have a residual solvent content of 0.2–13% by weight, preferably of 0.5–8% by weight, before stretching. The residual solvent content can be selectively established by predrying the poured dispersions before the subsequent stretching process. The stretching of the soot- or graphite-filled films can be performed as described above for the unfilled polycondensate cast films.

It was found that both the unfilled and also the soot- or graphite-filled films to be used according to the invention have a series of surprising properties which make them particularly suitable for a range of special applications. This applied even to the extruded films and applies to a particular extent to the cast films.

Electrical resistance films as printing ribbons for so-called nonimpact printing, which is a thermal recording process, are a further outstanding possible application for the soot- or graphite-, in particular soot-containing films which can be used according to the invention (electrothermal ribbon, ETR process). In addition to the high surface quality of the films, the high heat deflection temperature, the high dimensional stability, the low tendency to stick even at high temperatures, the extraordinarily good adhesion to metal, e.g. for deposition of Al by evaporation, the good mechanical properties and also the high abrasive strength of the films are of advantage in this connection. For use as printing ribbons, the soot-containing polycondensate films which can be used according to the invention are provided with various coatings (metal coating, e.g. Al; fusible printing-ink layer; optionally an insulation layer as a further resistance layer), as they are described, for example, in the following publications:

| | |
|---|---|
| U.S. Pat. No. 4,308,318, | European Patent 59,308 |
| U.S. Pat. No. 4,103,066, | European Patent 116,313 |
| U.S. Pat. No. 4,320,170, | European Patent 82,269 |
| U.S. Pat. No. 4,269,892, | U.S. Pat. No. 4,350,449 |
| U.S. Pat. No. 4,291,994, | European Patent 76,892 |
| European Patent 88,156. | |

The soot-containing polycondensate films which can be employed for the ETR process have, in particular, thicknesses of 1–100 μm, preferably of 5–60 μm and particularly preferably of 10–30 μm and also, in particular specific surface resistances of 50–5,000Ω, preferably 100–1,000Ω. The employment of the soot-containing films of polycondensates, as they have been defined above, which can be used according to the invention, for the ETR process results in excellent printed images.

The films to be used according to the invention can also be employed with advantage as printing ribbons for nonimpact printing, but by processes other than the ETR process, and in particular by the TRC process and similar processes (thermal carbon ribbons, thermofusion transfer process, sublimation printing process). In these thermal recording processes, the film is coated on one side with a layer containing a fusible or sublimable printing ink or with a layer consisting of fusible or sublimable printing ink. The heat necessary to melt the printing ink is not generated in the ribbon itself, as in the ETR process (v.s.), but is transferred to the ribbon from a thermal head across which the ribbon is passed. As a consequence of the excellent surface quality, the high heat deflection temperature under load, the low or non-existent tendency to stick at high temperatures, the negligible thermal ageing, the good windability (strength and low tendency to stick, in particular of a film matt on one side), the good abrasion resistance and the good adhesion of the ink-providing layer, the film according to the invention is surprisingly well suited as a printing ribbon for the TRC process. The typeface is extremely sharp and uniform. Preferably, film thicknesses of 1–30 μm, particularly preferably of 2–15 μm, quite particularly preferably of 3–10 μm, are employed for the TRC process.

The films to be used according to the invention are suitable for the preparation of printing ribbons because of their high and relatively constant tensile impact strength; cf. Example 3. These printing ribbons, which can e employed, for example, in typewriters and printers, virtually no longer exhibit any tears even under high stresses as may occur in other tapes. As a consequence of this, the tape reels, just like the guide system and the advance of the tapes in the printing process, do not have to be extraordinarily demandingly designed. Multiple use also becomes possible as a result of the reduced tendency of the ribbons to break.

The particular suitability of the films to be used according to the invention emerges particularly clearly for very thin films (thickness, for example, 2 to 15 μm) as are required for thermal recording processes, and for films rendered electrically conductive by fillers (thickness, for example, 10 to 30 μm), as are required for electrothermal recording processes, because a susceptibility to tear is particularly acutely conspicuous in this process.

The percentage data of the examples below relate, unless otherwise indicated, to the weight.

EXAMPLE 1

Properties of Films from BPA/TER/ISO Polyestercarbonates Containing 74 mol-% of Polyester Fraction and Terephthalate/Isophthalate Unit Ratio of 1/1

From 2,2-bis(4-hydroxyphenyl)propane, terephthalic acid dichloride, isophthalic acid dichloride, phosgene and p-isooctylphenol as chain limiter a polyestercarbonate containing 74 mol-% polyester fraction, 26 mol-% polycarbonate fraction and a terephthalate/isophthalate unit ratio of 1/1 was prepared by the continuous two-phase interface process described above (APE 74 K). The relative viscosity was 2.03 (measured in methylene chloride at c=5 g/l and 25° C.), the Na content (from salt not completely washed out) was 12 ppm, the glass transition temperature was 198° C. (measured by differential thermal analysis).

For comparison purposes, a polyester carbonate of the same composition was prepared batchwise by the two-phase interface process (APE 74 D). This had a relative viscosity of 2.9 (measured as above).

The APE 74 K and the APE 74 D were poured under the same conditions from their methylene chloride solutions to form 12 μm thick films and subsequently stretched at stretching temperatures of 215° C. as described above.

For APE 74 D an elongation at break of 83% was measured on the 12 μm film (unstretched). The maximum draw ratio was 1/1.9.

For APE 74 K an elongation at break of 114% was measured on the 12 μm film (unstretched). the maximum draw ratio was 1/2.3.

The particularly high heat deflection temperature of the films from polyestercarbonates of high relative viscosity (such as e.g. for APE 74 K, Tg=198° C.) is surprising.

EXAMPLE 2

Soot-filled APE 74 K Films

The soot-containing films with the experiment numbers 1–11 listed in the table below were prepared in the manner described below. The APE 74 K described in Example 1 was employed as polyestercarbonate for preparing the films. As conductivity soot, firstly a soot with a BET surface of 254 m$^2$/g and a DBP adsorption of 178 ml/110 g (Exp. No. 1–5), and secondly, a soot with a BET surface of 1,000 m$^2$/g and a DBP adsorption of 400 ml/100 g (Exp. No. 6–11) were used.

In the experiments No. 1–5, the soot was predispersed to a strength of 6–9%, and in the experiments No. 6–11 to a strength of 2–4% in methylene chloride. The polyester APE 74 K was then sprayed in the form of a 10% solution in methylene chloride into the soot dispersion. The polyestercarbonate solution containing dispersed soot was then postdispersed, and after filtration through a 50 μm polyamide fabric and preliminary evaporation down to dispersions with viscosities of 8,000–12,000 mPa.s was poured to form polyestercarbonate films on a drum casting machine and postdried (residual solvent content VDE 0345, ½ hours 160° C.: <1%). The properties of the films obtained are listed in the Table.

A part of the film listed in the table with the experiment No. 10 was processed further before the final drying (residual solvent content 4%). It was stretched on a single-nip stretching machine with a draw ratio of 1/1/5 as is described in the text of this application. The mechanical testing of the film obtained revealed that the mechanical values of the film are considerably improved after stretching. Thus, the tear strength is increased from 65 N/mm² (see Table, Exp. No. 10) to 72 N/mm² and the elongation at break from 4.8% (see Table, Exp. No. 10) to 15.3%. Furthermore, the surface resistance is increased from 123Ω to 264Ω by stretching.

The table shows that films with interesting properties can be obtained by incorporating soot in polyestercarbonates. Thus, the films can achieve e.g. very low surface and volume resistances with good mechanical properties. These resistances can be varied considerably by varying the soot fraction, the film thickness, the soot BET surface and the degree of stretching. Of advantage is the fact that a particularly favourable solution can be found for the particular application by the suitable choice in each case of the nature of the variation. A further advantage of the soot-filled films according to the invention is their surprisingly higher heat deflection temperature compared with non-soot-filled films according to the invention. Thus, a heat deflection temperature which is higher by over 10 C. is achieved e.g. with 28% by weight soot filling.

TABLE

Properties of soot-filled APE 74-K films

| | Conductivity soot | | | Film properties | | | |
|---|---|---|---|---|---|---|---|
| Exp. No. | BET surface (m²/g) | Fraction (%) | Film thickness (μm) | Spec. surface resistance (Ω) | Volume resistance (Ω, cm) | Tear strength (N/mm²) | Elongation at break % |
| 1 | 254 | 15.2 | 30 | 300 000 | 950 | — | — |
| 2 | 254 | 20.3 | 30 | 8 060 | 24 | 66 | 10.3 |
| 3 | 254 | 20.3 | 18 | 18 670 | 34 | — | — |
| 4 | 254 | 28.5 | 30 | 558 | 1.7 | 64 | 7.4 |
| 5 | 254 | 28.5 | 15 | 1 592 | 2.7 | — | — |
| 6 | 1000 | 15.8 | 25 | 1 120 | 2.7 | 65 | 7.8 |
| 7 | 1000 | 15.8 | 13 | 2 183 | 2.7 | 68 | 7.9 |
| 8 | 1000 | 20.5 | 26 | 435 | 1.0 | — | — |
| 9 | 1000 | 20.5 | 14 | 910 | 1.2 | 70 | 6.6 |
| 10 | 1000 | 28.0 | 28 | 123 | 0.35 | 65 | 4.8 |
| 11 | 1000 | 28.0 | 14 | 266 | 0.36 | 60 | 3.8 |

This table serves primarily to demonstrate the increased conductivity due to soot. Since the soot was dispersed by means of a laboratory dispersion process, the tear strength and elongation at break values are considerably below the values achievable in practice.

EXAMPLE 3

Tensile impact strength $a_{zn}$ of stretched 6 μm films from the polyestercarbonate APE 74 K of Example 1. Stretched 6 μm films from bisphenol A-polycarbonate (PC), polyethylene terephthalate (PET) and polysulphone (PSU) based on bisphenol A and dichlorodiphenylsulphone) served as a comparison.

| Individual values (E) and mean values (MW) of the tensile impact strength $a_{zn}$ [cm kgf/cm²] | | | | |
|---|---|---|---|---|
| E or MW | APE 74 K | PC* (comparison) | PET* (comparison) | PSU* (comparison) |
| E | 1810 | 2170 | 170 | 171 |
| E | 1980 | 730 | 980 | 352 |
| E | 1630 | 1590 | 430 | 96 |
| E | 1900 | 3050 | 1310 | 58 |
| E | 2110 | 1830 | 820 | 130 |
| E | 1550 | 510 | 1580 | 217 |
| E | 1730 | 890 | 210 | 328 |
| E | 1680 | 2100 | 470 | 138 |
| E | 2050 | 2630 | 190 | 295 |
| E | 1720 | 1280 | 580 | 398 |
| MW | 1816 | 1678 | 674 | 218 |

*PC $\eta_{rel}$ = 2.059 (measured in CH₂Cl₂), at 25° C., c = 5 g/l)
*PET $\eta_{rel}$ = 1.471 (measured in phenol/o-dichlorobenzene 1/1, at 25° C., c = 5 g/l)
*PSU $\eta_{rel}$ = 1.263 (measured in CH₂Cl₂, at 25° C., c = 5 g/l)
*typical materials for film preparation.

The tensile impact strength of the film from aromatic polyester carbonate which can be used according to the invention shows a particularly high mean value. This is due, inter alia, to the relatively low deviations from the mean value. This becomes particularly clear in comparison with the polycarbonate film whose tensile impact strengths are high in individual cases, but are subject to fairly large variations from case to case.

We claim:

1. A printing ribbon for thermal and electrothermal recording process comprising a polycondensate film containing 75-100 mol-% of bifunctional structural units of the formulae (1) and optionally (2)

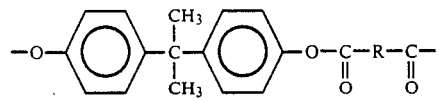   (1)

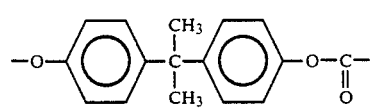   (2)

and 25-0 mol-% of bifunctional structural units of the formulae (3) and optionally (4)

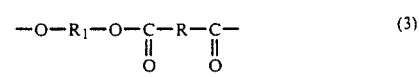   (3)

   (4)

where the acid radicals —CO—R—CO— in the formulae (1) and (3) denote 75-100 mol-% of tere-, or isophthalic acid radicals or mixtures thereof and 25-0 mol-% of radicals of other aromatic dicarboxylic acids and the radicals —O—$R_1$—O— in the formulae (3) and (4) denote diphenols other than 2,2-bis(4-hydroxyphenyl)propane radicals contained in formula (1) and (2), wherein if the units of formulae (2) or (4) or both are present, the molar ratio of the ester groups of formulae (1) and (3) to the carbonate groups of formulae (2) and (4) in the polycondensate is not greater than 10/90.

2. A printing ribbon according to claim 1, characterized in that the polycondensates are polyestercarbonates with an ester/carbonate group molar ratio of 95/5 to 10/90 and a relative viscosity of 1.7 to 3.0 (measured at c=5 g/l and 25° in methylene chloride) and are prepared by a continuous two-phase interface process, in which 1. diphenols, dissolved as diphenolate in an alkalinely aqueous phase, acid chlorides, dissolved in a chlorinated hydrocarbon or a mixture of chlorinated hydrocarbons, and optionally phosgene are fed simultaneously and continuously into a first reactor effecting mixing,
2. the two-phase mixture continuously discharged from the first reactor and also phosgene and optionally alkali-metal hydroxide and optionally further organic solvent are continuously fed into a second reactor effecting mixing,
3. the two-phase mixture continuously discharged from the second reactor and optionally further alkali-metal hydroxide are continuously fed into a third reactor effecting mixing,
4. the fully reacted two-phase mixture continuously discharged from the third reactor is separated into the organic and the aqueous phase, the organic phase is washed in the absence of electrolyte and the polyestercarbonate is extracted from the organic phase, and
5. catalyst and optionally chain limiter are continuously fed into at least one of the reactors.

3. A printing ribbon according to claim 1, characterized in that the polycondensate film contains 5–45% by weight of soot or graphite mixed in.

4. A printing ribbon according to claim 2, characterized in that the polycondensate film contains 5–45% by weight of soot or graphite mixed in.

5. A printing ribbon according to claim 3, characterized in that the film is stretched by 5–200% monoaxially or biaxially.

6. A printing ribbon according to claim 2, characterized in that the film is stretched by 5–200% monoaxially or biaxially.

* * * * *